United States Patent [19]

Pocholle et al.

[11] Patent Number: 5,384,801
[45] Date of Patent: Jan. 24, 1995

[54] POWER LASERS WITH SEMICONDUCTOR FILTER

[75] Inventors: Jean-Paul Pocholle, La Norville; Jean-Marc Breteau, Verrieres; Michel Papuchon, Palaiseau; Claude Puech, Ballainvilliers, all of France

[73] Assignee: Thomson-CSF, Puteaux, France

[21] Appl. No.: 949,125

[22] Filed: Sep. 23, 1992

[30] Foreign Application Priority Data

Sep. 24, 1991 [FR] France .................. 91 11740

[51] Int. Cl.⁶ .............................. H01S 3/18
[52] U.S. Cl. .......................... 372/43; 372/39; 372/98
[58] Field of Search .................. 372/43, 39, 98

[56] References Cited

U.S. PATENT DOCUMENTS

| | | | |
|---|---|---|---|
| 4,228,349 | 10/1980 | Ettenberg et al. | |
| 4,528,464 | 7/1985 | Chemia et al. | 372/50 |
| 4,599,728 | 7/1986 | Alani et al. | 372/45 |
| 4,857,971 | 8/1989 | Burnham | 372/45 |

FOREIGN PATENT DOCUMENTS 190635 8/1986 European Pat. Off. .
55-011363 1/1980 Japan .

OTHER PUBLICATIONS

D. Cotter, Optics Communications, vol. 43, No. 3, Oct. 1982, pp. 200–202. "High power single–frequency laser at 1.32 mum using Nd:YAG".

*Primary Examiner*—Léon Scott, Jr.
*Attorney, Agent, or Firm*—Oblon, Spivak, McClelland, Maier & Neustadt

[57] ABSTRACT

A laser is capable of working at a wavelength $L_2$ from an active material capable of generating radiating emissions at at least two wavelengths $L_1$ and $L_2$, through the presence of a semiconductor plate in the laser cavity. Notably, the laser can generate wavelengths ranging from 1.4 μm to 2 μm, a range in which the optical damage threshold of the eye is high, from an $Nd^{3+}$ doped YAG having numerous radiating emission wavelengths ranging from 0.946 μm to 1.8 μm.

9 Claims, 1 Drawing Sheet

POWER LASERS WITH SEMICONDUCTOR FILTER

BACKGROUND OF THE INVENTION

The invention relates to coherent optical sources and notably to solid state lasers.

These lasers have a cavity in which it is possible to insert solid materials such as glasses or crystals doped with rare earth ions which, when photoexcited, generate radiating emissions whose efficiency varies with the frequency of emission. Certain applications relate to well-determined frequencies and, in this case, they can be hampered by other, more efficient radiating emissions. This is why, when a source emits at least two radiating emissions at frequencies $f_1$ and $f_2$, and when the frequency $f_2$ is located in the spectral band with which the application is concerned, the cavity should include a filtering device so as to generate only the desired emission at the frequency $f_2$. This type of problem arises notably in sectors such as those of target designation or telemetry or, again, industrial forming which use lasers that should meet the criteria of eye safety. Indeed, the optical damage threshold of the eye in terms of energy is higher in the 1.4–1.6 $\mu$m window. To this end, it is necessary to have available coherent optical sources that emit in this spectral window. However, if sources of this type emit at other frequencies, it becomes indispensable to eliminate these other frequencies. Among the sources that emit in the 1.4-1.6 $\mu$m spectral window, there are coherent optical sources comprising a material such as the YAG crystal doped with $Nd^{3+}$ ions which has the valuable feature of being a system with more than three levels of energy. These are levels between which the radiating emissions at several frequencies are furthered by the presence of a non-radiating emission with lower energy that prevents saturation between the excited states. However, the emission wavelengths of an $Nd^{3+}$ doped YAG crystal $(Y_3Al_5O_{12})$ are numerous:

$L_1=0.946$ $\mu$m, $L_2=1.06$ $\mu$m, $L_3=1.318$ $\mu$m, $L_4=1.8$ $\mu$m and more specifically, each energy level corresponding to these wavelengths is actually constituted by a set of sub-levels due to the effect of the crystal field on the electronic states of the $Nd^{3+}$ ion (Stark effect). Thus, there are several wavelengths of radiating emission in the neighborhood of $L_3$ which are more specifically the wavelengths $L_{3i}$ indicated in micrometers in the table 1 here below, with their respective efficiency observed during lamp pumping on the different emission lines. The efficiency is indicated in terms of relative value, and more specifically in terms of percentage of energy totally emitted on all the levels $L_{3i}$.

TABLE 1

| $L_{3i}$ | 1.3188 $i=1$ | 1.3200 $i=2$ | 1.3338 $i=3$ | 1.3350 $i=4$ | 1.3382 $i=5$ | 1.3410 $i=6$ | 1.3564 $i=7$ | 1.4140 $i=8$ | 1.4440 $i=9$ |
|---|---|---|---|---|---|---|---|---|---|
| Effic. | 34 | 9 | 13 | 15 | 24 | 9 | 14 | 1 | 0.2 |

SUMMARY OF THE INVENTION

To resolve the problem of the selection of emission wavelengths and notably the problem that arises in the field of eye safety, the invention proposes a laser comprising a cavity in which there is placed a doped material capable of emitting radiating transitions at at least two frequencies $f_1$ and $f_2$, wherein there is inserted, in the cavity on the path of the beam, a layer of semiconductor material having a gap width (between the valence band and the conduction band) such that $hf_2$ is smaller than the gap width and $hf_1$ is greater than this width, h being the Planck constant, to have a laser emitting at the frequency $f_2$. Furthermore, the layer of semiconductor material may be inclined with respect to the direction of the beam with an incidence along the Brewster angle so as to have a polarized laser beam available.

When wavelengths greater than 1.4 $\mu$m are concerned, the semiconductor material may be an InPAsGa alloy having a gap width G located at 0.888 eV. More specifically, when an active $Nd^{3+}$ doped YAG material is used, it is possible to use a semiconductor material having a gap width ranging from 0.888 eV to 0.916 eV. Indeed, to select the radiating emissions that occur at wavelengths greater than $L=1.4$ $\mu$m, it is necessary for the other emission wavelengths to be such that they generate possible transitions between valence band and conduction band at the expense of the radiating emissions. In the case of the $Nd^{3+}$ doped YAG crystal, the $L_{31}, L_{32}, \ldots, L_{37}$ transitions should therefore meet the following criterion (A): $hc/L_{3i} > G(A)$. where: G is the gap width of the material, also called the gap energy, c is the velocity of light ($c=3.10^{10}$ cm/s), h is the Planck constant ($h=4.14.10^{-15}$ eV/s).

The condition (A) thus determines the gap of the material to be selected.

To prevent the radiating emission at the greatest of these wavelengths from being the wavelength $L_{37}$, it is therefore necessary for the gap G to be smaller than 0.916 eV.

Quatenary compounds of the $In_{1-x}Ga_xAs_yP_{i-y}$ type are likely to be suitable for determined values of x and y.

BRIEF DESCRIPTION OF THE DRAWING

The invention will be understood more clearly and other advantages will appear from the following description, given by way of a non-restrictive example, and from the single appended figure which represents an example of a laser according to the invention comprising, in its cavity, a layer of semiconductor material deposited on a substrate and placed on the path of the laser beam.

MORE DETAILED DESCRIPTION

Figure 1:
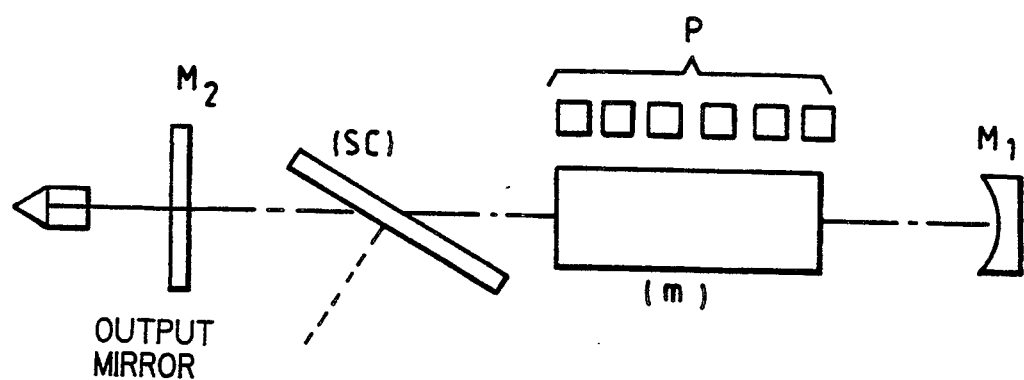

The laser according to the invention comprises an active material (m) capable of being the seat of coherent radiating emission. This material can be photon-pumped by pumping modules (P) such as laser diodes, two mirrors $M_1$ and $M_2$ being used to constitute a resonant cavity, one of the mirrors being semi-transparent enough to enable the output of the incident radiation.

The laser according to the invention further comprises a layer of semiconductor material (SC) placed on the path of the light beam (FIG. 1) so as to select certain wavelengths. Furthermore, this layer may itself serve as a polarizing element at the wavelength of the laser transition if its inclination is adjusted with respect to the optical axis of the cavity. Indeed, the phenomenon exploited in this case is the selectivity of transmission in polarization related to the Brewster conditions which lead to a maximum transmission only for a particular polarization of the incident light. This is why, after numerous passages in the resonant cavity, only this polarized light is recovered at output of the cavity. This property may be particularly useful if the laser additionally has, in its cavity, a triggering module using the Pockels effect enabling the polarized beam to be interrupted or to be let through, thus making a pulse controllable laser.

Within the context of applications relating to the 1.4 µm–2 µm spectral window, the following is an exemplary embodiment of a laser according to the invention:

The material (m) is an $Nd^{3+}$ doped YAG crystal bar pumped by laser diodes.

The semiconductor material placed on the path of the light beam should have major losses at wavelengths below 1.4 µm and excellent transmission beyond this value. The GaInAsP type III–V semiconductor compounds meet these requirements especially well. Furthermore, by asjusting the composition of this quatenary alloy, it is possible to adjust the transmission window of the sample with very high precision. This material can be deposited on an InP substrate by using the standard techniques of deposition by epitaxy, and this can be achieved with excellent homogeneity on large surface areas (compatible with the dimension of the mode of an Nd:YAG laser). Furthermore, in order to minimize the losses on the laser transition sought, which is beyond 1.4 µm, it is necessary to use a substrate that is as intrinsic as possible. Indeed, if the substrate has a high density of electrons, the result is an absorption related to the plasma of electrons, the cut-off frequency of which ultimately reaches the range of the optical frequencies. The quatenary compound, GaInAsP, deposited on InP should have a composition such that it has a "gap" energy greater than 0.888 eV and lower than 0.916 eV, preferably between 0.893 eV and 0.916 eV. The following compounds meet these criteria particularly well: the compounds $In_{1-x}G_xAs_yP_{1-y}$ with y ranging from 0.70 to 0.73 and x ranging from 0.324 to 0.338. In practice, on an intrinsic InP substrate, x is defined by the relationship $x = 0.1894\ y/0.4184 - 0.013\ y$, for it is not any combination whatsoever of x and y that can enable the growth of the alloy on InP. These compounds indeed have gap energies of 0.893 eV to 0.906 eV. Notably, the layer of semiconductor material may thus be a layer of $In_{0.662}G_{0.338}As_{0.73}P_{0.27}$ alloy deposited on an InP substrate. The greater the losses introduced into the cavity, the more efficient is the wavelength selection of a layer such as this.

Now, by bringing the thickness of the semiconductor material into play, it is possible to control these losses, since the absorption of the wafer depends on the thickness of the material deposited. Thus, the insertion of a wafer of InGaAsP semiconductor material with a thickness of 2 to 10 µm deposited on an InP substrate makes it possible to introduce losses sufficient for the transitions corresponding to the emission of the wavelengths below 1.4 µm. For example, the variation of the absorption coefficient between 1.4 µm and 21.32 µm is in the range of 1000 $cm^{-1}$. The dimensions of the wafer of semiconductor material are dictated by the Brewster angle at which the wafer is placed in relation to the optical axis of the cavity. By using the $In_{0.662}G_{0.338}As_{0.73}P_{0.27}$ quatenary alloy with an optical index of 3.477 at the 1.44 µm wavelength, the Brewster angle defined between the optical axis of the cavity and the normal to the wafer is 73.96°. This fact, if a cylindrical laser beam with an initial diameter of 1 mm is used, dictates a projection on the air-layer interface, defined by an ellipse, the biggest axis of which has a length of 3.477 mm. Thus, the minimum width of the layer of semiconductor material is 3.477 mm.

In order to raise the performance characteristics with regard to wavelength selectivity, it is possible to increase the number of layers of semiconductor material on the path of the incident beam, thus increasing the thickness of the absorbent medium. Several substrates, each bearing a semiconductor layer, are then joined to one another.

What is claimed is:

1. A laser including a cavity in which there is placed a doped active material which emits radiating transitions at at least two frequencies $f_1$ and $f_2$, wherein there is inserted, in the cavity in a path of a beam, a layer of semiconductor material having a gap width between a valence band and a conduction band such that $hf_2$ is smaller than the gap width and $hf_1$ is greater than this width, h being the Planck constant, the laser thus emitting at the frequency $f_2$.

2. A laser according to claim 1, wherein the layer is inclined with respect to the direction of the beam with an incidence at Brewster's angle to polarize the laser beam.

3. A laser according to claim 2, which emits a wavelength greater than 1.4 µm, wherein the semiconductor material is an InPAsGa quaternary alloy having a gap width G, greater than 0.888 eV.

4. A laser according to claim 1, which emits a wavelength greater than 1.4 µm, wherein the semiconductor material is an InPAsGa quaternary alloy having a gap width G, greater than 0.888 eV.

5. A laser according to claim 4, wherein the laser material is an $Nd^{3+}$ doped YAG crystal and wherein the semiconductor material has a gap width of less than or equal to 0.916 eV.

6. A laser according to claim 5, wherein the semiconductor material has a gap width ranging from 0.893 eV to 0.916 eV.

7. A laser according to claim 6, wherein the semiconductor material is an $In_{1-x}Ga_xAs_yP_{i-y}$ quatenary compound deposited on an InP substrate with y ranging from 0.70 to 0.73 and x ranging from 0.324 and 0.338.

8. A laser according to claim 7, wherein the InP substrate is substantially intrinsic.

9. A laser according to any of the claims 1 or 8, wherein several substrates covered with a semiconductor layer are inserted in the cavity.

* * * * *